F. L. HOLLISTER.
MAGNETO ELECTRIC MACHINE.
APPLICATION FILED DEC. 8, 1913.

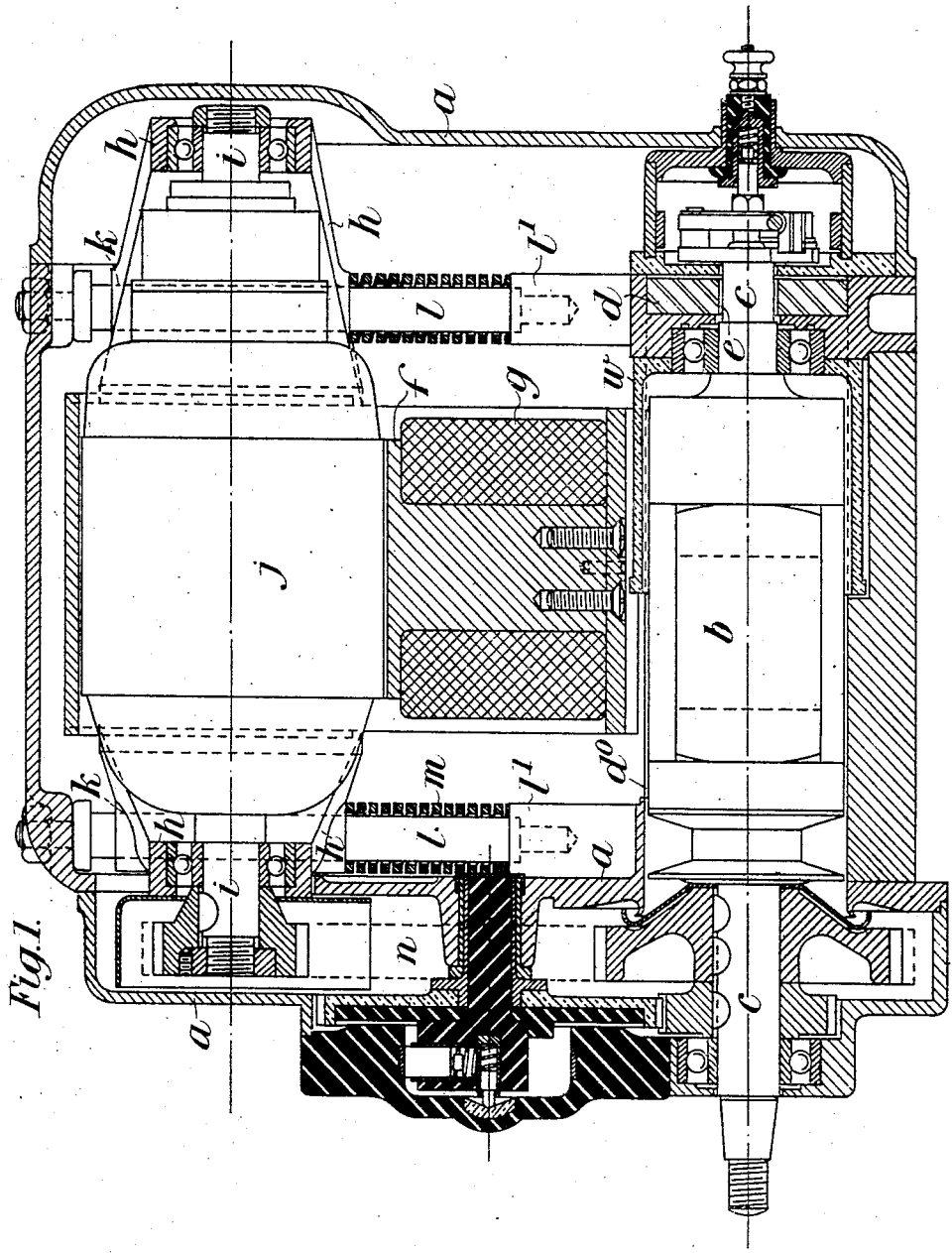

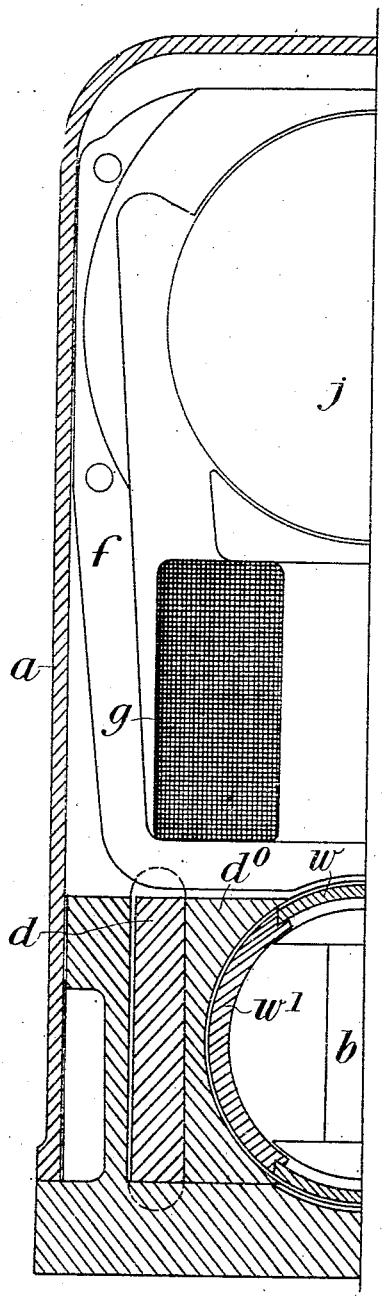

1,234,901.

Patented July 31, 1917.
7 SHEETS—SHEET 3.

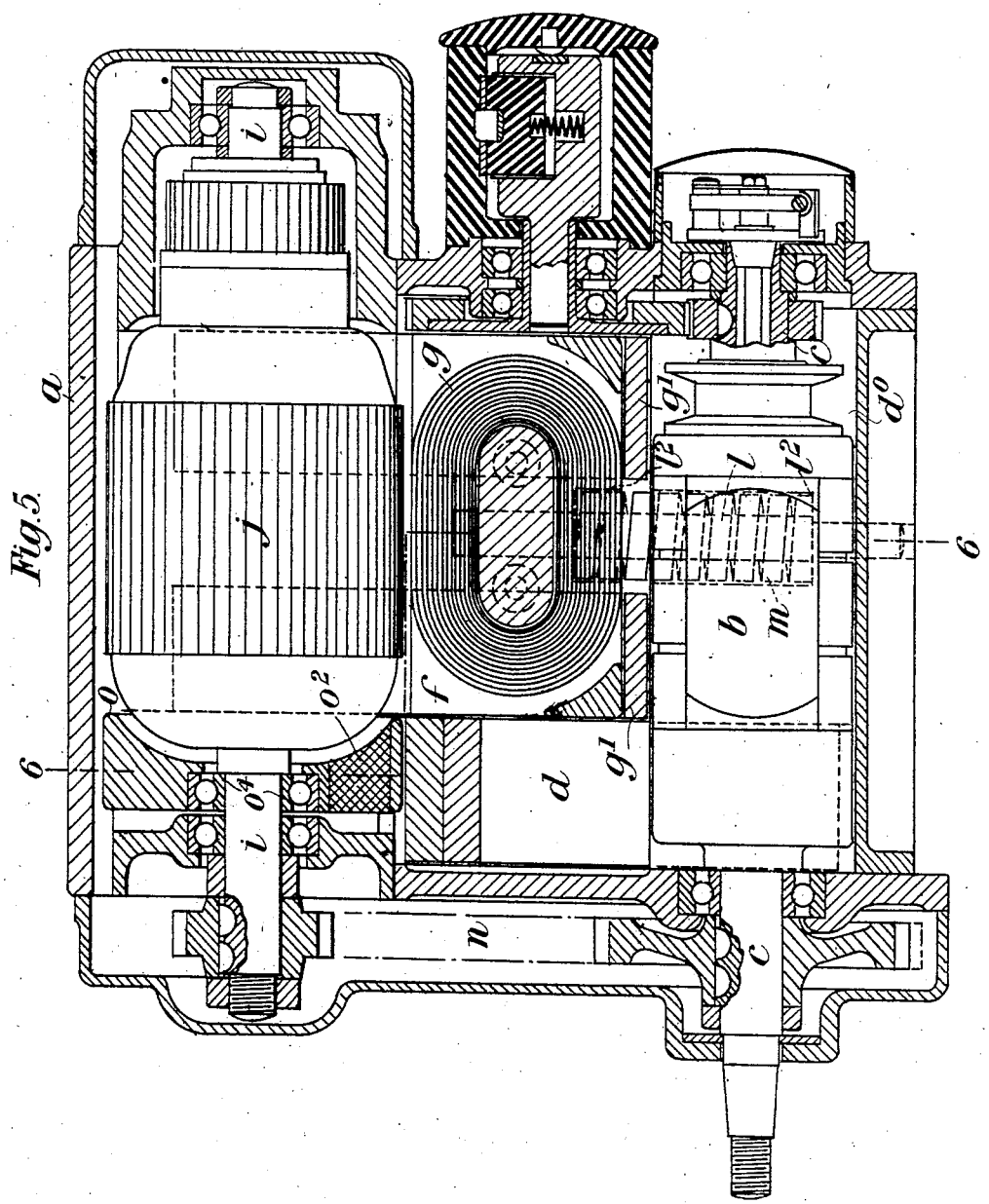

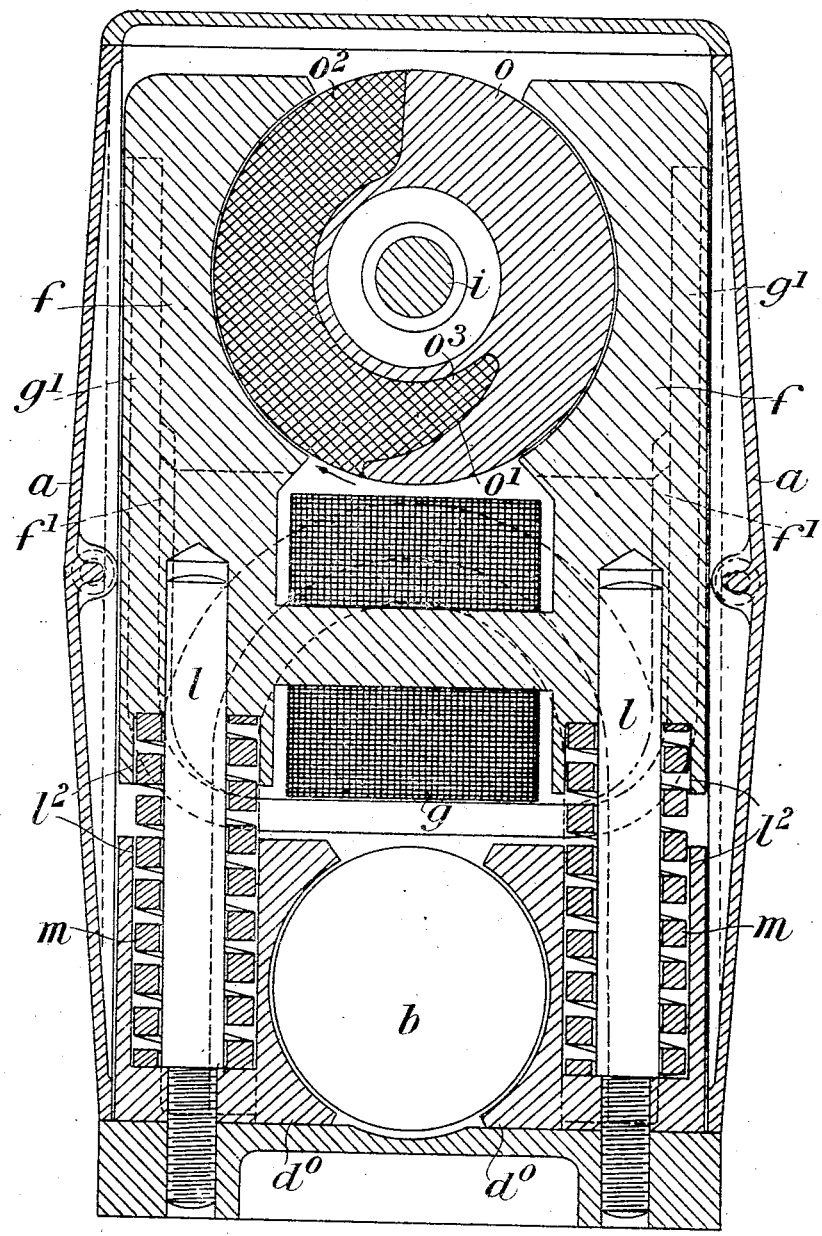

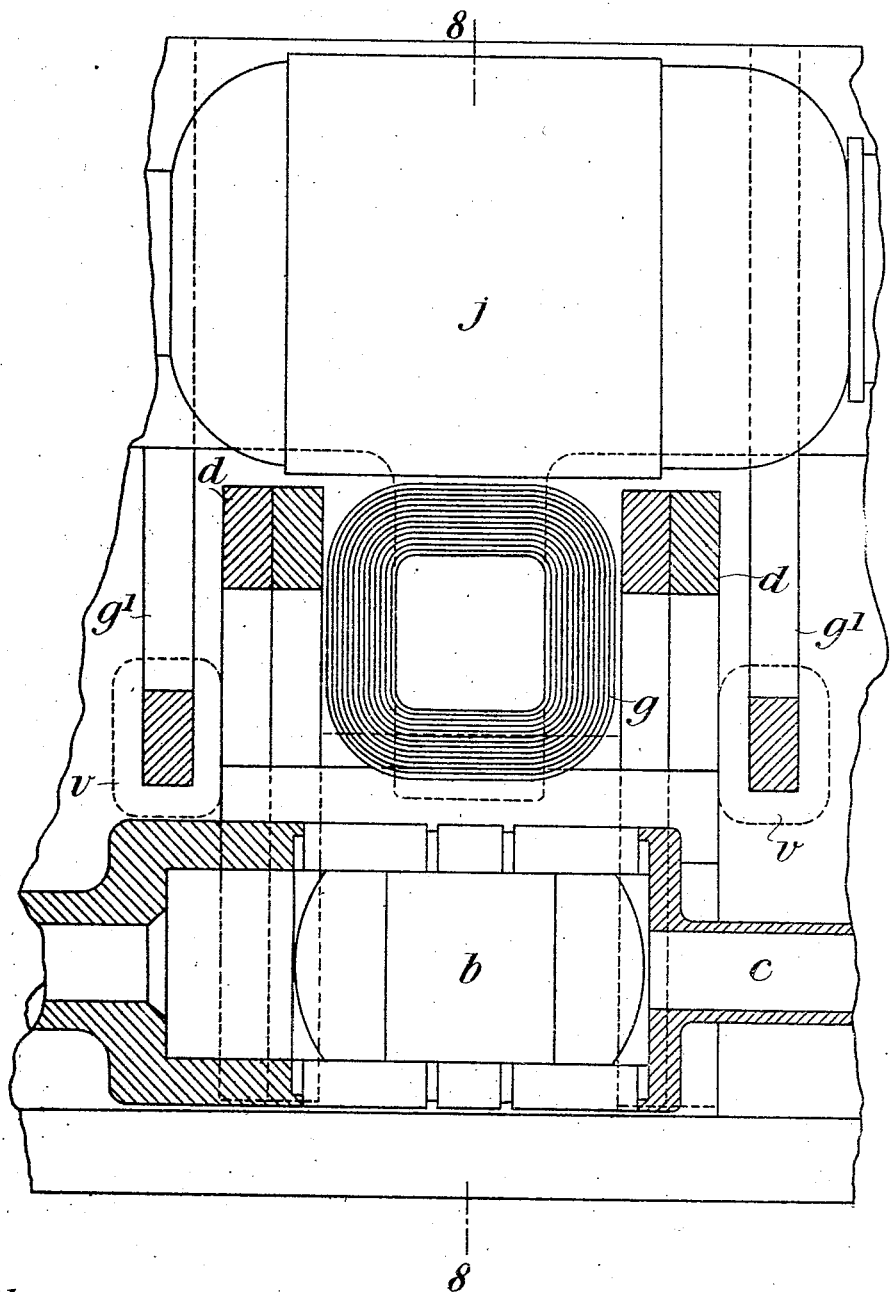

UNITED STATES PATENT OFFICE.

FREDERICK LOUIS HOLLISTER, OF LONDON, ENGLAND.

MAGNETO-ELECTRIC MACHINE.

1,234,901. Specification of Letters Patent. Patented July 31, 1917.

Application filed December 8, 1913. Serial No. 805,362.

*To all whom it may concern:*

Be it known that I, FREDERICK LOUIS HOLLISTER, a subject of the King of Great Britain, residing at 66 Sandringham road, Willesden Green, London, England, have invented new and useful Improvements in Magneto-Electric Machines, of which the following is a specification.

My invention relates to machines for generating electric current for dual purposes, such, for example, as the ignition of the explosive charge in internal combustion engines used on motor road vehicles, and for the illumination of such vehicles, the object being to provide a more compact and efficient apparatus than that now in use.

A magneto electric machine of the permanent magnet type has already been proposed for this purpose which is provided with two pairs of relatively stationary polepieces between each pair of which there rotates an armature, one of which is designed for the generation of current for ignition purposes and the other of current for illuminating purposes; one of the said armatures being driven from the engine and the other from the first named armature.

Now, according to my invention I construct a machine between the poles of which the said armature rotates, and in conjunction with the said magneto-machine, I arrange a second unit or machine comprising a dynamo armature which rotates in a magnetic field provided by electro-magnets or by electro-magnets and permanent magnets in combination. The two machines or units are preferably mounted in a single frame or carcass, but in such a manner that they can move relatively to one another, and the dynamo armature is driven from the magneto armature, (which is itself driven from the engine), by means of a flexible drive, such as a chain or belt, the relative movement of the two machines permitting the necessary adjustment to be made to compensate for wear in the flexible drive.

As will be understood, the magnetic fields in which the two armatures rotate are independent of one another, and, in practice, the dynamo machine is advantageously arranged above the magneto-machine, the magnets of which may be upright or horizontal, so that the said dynamo machine can, when necessary, be entirely removed from the magneto-machine without in any way interfering with the efficient operation of the latter machine. This is of considerable practical importance, since the dynamo machine is less durable and is more liable to get out of order than the magneto machine.

In practice the method of mounting the two machines so as to obtain the results above described may vary to suit requirements. For example, the dynamo machine may be arranged above the magneto-machine in such a manner that portions of the one slide in, or intermesh with, portions of the other, and, in some cases, springs may be arranged between the sliding parts normally tending to hold the units in correct adjustment, set-screws or other locking devices being provided, if necessary, for securing them in any relative position to which they may be adjusted. With such a construction, on releasing the set-screws or other locking devices, the springs take up any play that may be caused by wear in the drive.

In the high tension distributer I may employ a radial brush which short circuits an annular segmental ring and the respective plug segment.

In a modified construction of machine the ignition unit is of the horizontal type and the magnets are staggered or inclined to one another so as to leave an opening or space at the crown through which the driving spindle passes, thus obviating the necessity of making the usual aperture in the crown.

To enable my invention to be fully understood, I will describe it by reference to the accompanying drawings, in which:—

Figure 1 is a sectional side elevation of one form of machine constructed according to my invention for generating electric current for dual purposes such as the ignition of the explosive charge in internal combustion engines of a motor road vehicle and the illumination of such vehicle.

Fig. 2 is a half transverse section thereof.

Fig. 5 is a view similar to Fig. 1 illustrating a modified construction of machine.

Fig. 6 is a section on the line 6—6, Fig. 5.

Fig. 7 is a sectional elevation of a part of a further construction of machine of the flat horse-shoe type in which the field of the dynamo unit is created by combined electro magnets and permanent magnets.

Figs. 1 and 5 are drawn to a smaller scale than the remaining figures of the drawing.

Figure 3:
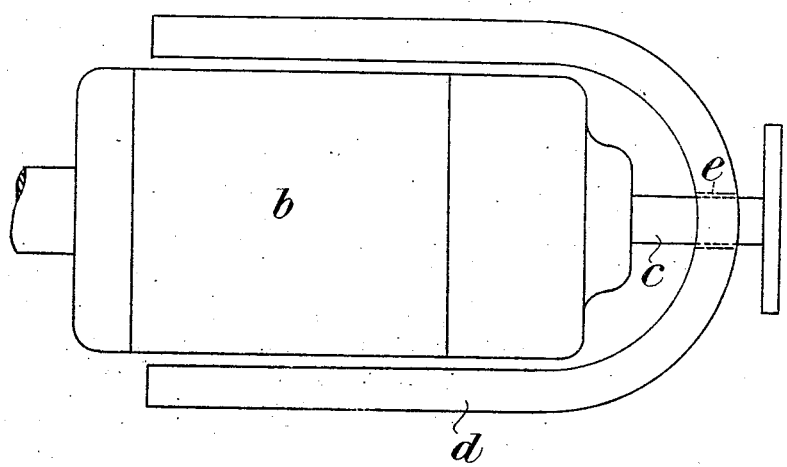
Fig. 3 is a plan view illustrating the magneto armature and magnet of the machine shown in Figs. 1 and 2.
Figure 8:
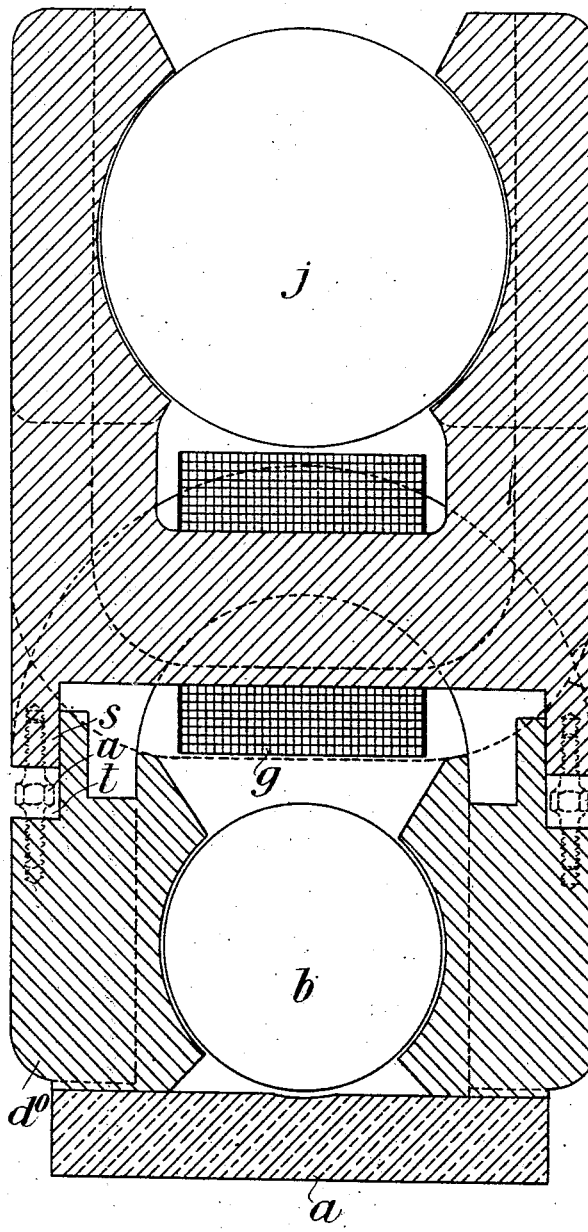
Fig. 8 is a vertical section on the line 8—8, Fig. 7.
Figure 9:
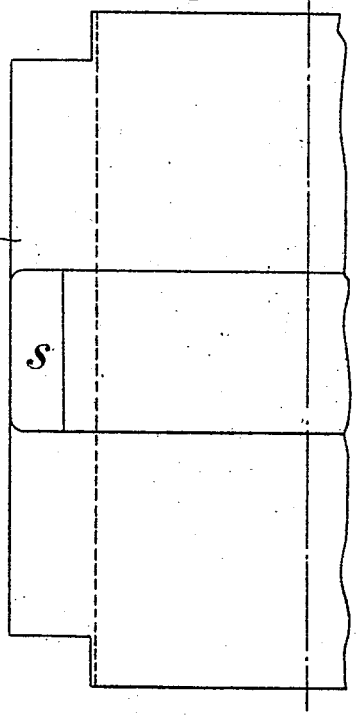
Fig. 9 is an underside view of a portion of the dynamo of the said machine.
Figure 10:
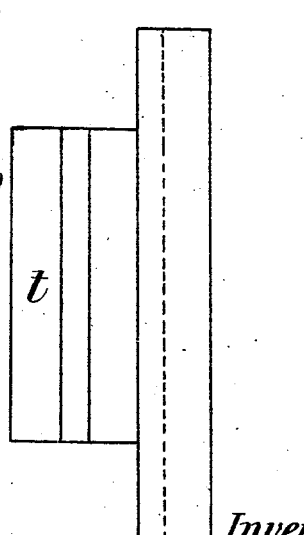
Fig. 10 is a plan of a portion of one of the magneto pole-shoes.

Referring first to the construction illustrated in Figs. 1 to 3, $a$ represents the carcass or housing of the combined machine, the said housing carrying at its lower part the magneto unit which comprises the armature $b$ mounted upon the spindle $c$ carried in bearings in the housing $a$ in the usual manner and the horse shoe magnet $d$ having the pole shoes $d^0$, the said magnet being arranged horizontally as will be seen by reference to Fig. 3 and being provided with an opening or space $e$ at the crown for the passage of the small armature spindle $c$. Within the housing there is also mounted above the magneto unit the independent and separable dynamo unit which comprises the pole-shoe frame $f$ which carries the electromagnet $g$ and the bearing-supports $h$ for the spindle $i$ of the armature $j$ which rotates between the pole-shoes in the usual manner. In the bearing-supports $h$ are formed holes $k$ through which, when the two separate units are mounted together in the housing $a$, are passed two pairs of guide pillars $l$, one pair at each end of the machine, which pillars, as will be obvious from Fig. 1, extend from the top to the bottom of the housing $a$. Between the supports $h$ and shoulders $l^1$ at the lower ends of the pillars $l$ there is coiled around each of the said pillars a spiral spring $m$, the said springs $m$ tending to keep the two separable magneto and dynamo units apart. The tension of the springs may merely serve to tighten the chain or other flexible drive $n$ by means of which the dynamo spindle $i$ is driven from the magneto spindle $c$ or means may be provided where necessary, for locking the two units in the positions to which they may be adjusted.

As above described, and, as will be obvious from the foregoing description of the construction of machine illustrated in Figs. 1 to 3, the magnetic fields in which the two armatures rotate are entirely independent of one another, and this being so, it will be readily understood that the upper or dynamo unit can be detached from the magneto unit without in any way interfering with the said magneto unit; this is a feature of considerable importance in practice in view of the fact that the magneto unit can be retained in place to function normally in the driving of the engine, while the dynamo may be detached for repairs or any other purpose as may be at any time desired. In other words, the machine comprises a pair of units, each of which performs its own separate function of generating an ignition or illuminating or like current and both can function at the same time, yet the one unit can be entirely detached from the other without causing any electrical or mechanical disturbance as regards the latter. The sparking obtained by the magneto unit at the advance and retard positions of the timing lever may be substantially equalized by means of a semi-rotating sleeve indicated at $w$, Figs. 1 and 2, fitted with pole pieces and connected to the timing lever preferably so that the timing pole shoes have imparted to them a differential movement. $w'$ are the pole pieces with which said sleeve, $w$, is provided, and the sleeve, $w$, may be connected with the timing lever (not shown) in any desired or convenient manner so that a movement of timing lever imparts movement to the sleeve, $w$, with the result that when the timing lever is in the retard position a maximum number of lines of force can pass through the magneto armature while with an increase of speed and with the advancement of the timing lever the sleeve will be moved back by the advancement of the timing lever sufficiently to compensate for the natural field distortion, thus giving substantially the same results at advance and retard positions of the timing lever with respect to the spark.

Figure 4:
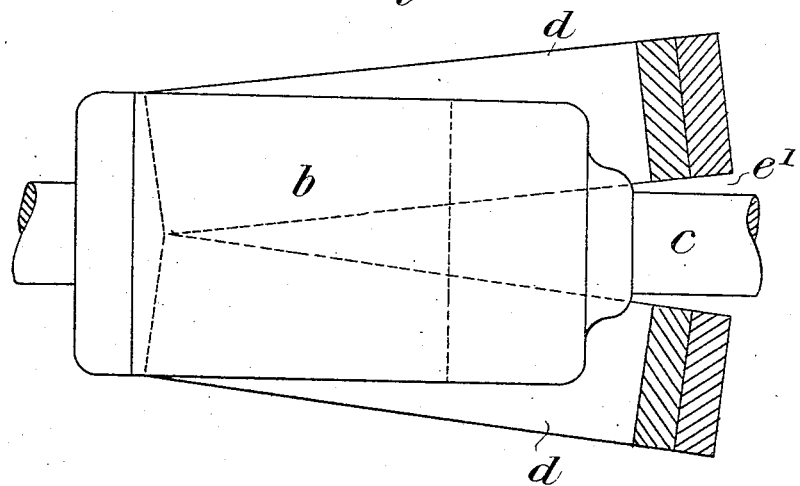
Fig. 4 is a sectional side view illustrating a modified arrangement of magneto armature and magnets.

In Fig. 4 I have illustrated a modified construction of magnet for the magneto unit, that is to say, a pair of approximately horizontal magnets $d$ are provided which are inclined relatively to one another in such a manner as to leave an opening or space $e^1$ at the crown, thereby obviating the necessity of forming the usual hole such as is illustrated at $e$, Fig. 3.

Figs. 5 and 6 show a construction of machine which is in principle the same as that described with reference to Figs. 1 and 2, in which, instead of employing two pairs of end guide pillars $l$, one single central pair of such pillars is made use of, the springs $m$ being housed in recesses $l^2$ in the pole pieces of the magneto and dynamo units. These figures also show the arrangement in which the magnets $d$ of the magneto unit are vertical instead of horizontal as in the construction already described. These vertical magnets are of the standard form and it will be recognized that existing magnets may be modified to adapt them for the purpose of this invention. The dynamo unit, moreover, has its field provided by a combination of an electro-magnet $g$ and permanent magnets $g^1$, the pole shoes $f$ being cut away as indicated at $f^1$, Fig. 6, so that the permanent magnets $g^1$ are not in contact with the said pole-pieces along their whole length, the object of this arrangement being to assist a low speed generation, by introducing resistance to the magnetic flux at the yoke portion of the pole shoes.

As above stated, the dynamo which I use in any form of my machine may advantageously be of the constant voltage variable output type, and regulation may be effected in any suitable manner. In Figs. 5 and 6, for example, I have shown in connection with the lighting armature, an oscillating or partially rotatable graduated magnetic sleeve composed partly of magnetic material, $o$, and partly of non-magnetic material $o^2$, and which can be adjusted in a rotary direction with respect to the armature and the pole shoes. As shown in Fig. 6, in section, the sleeve $o$, is cut away on one side of this axis for nearly one half its extent, and is further provided with a recess, $o^1$, extending from a point near the periphery inwardly to a point nearer the axis and the cylindrical form of the sleeve is completed by the non-magnetic material, $o^2$, which has a portion, $o^3$, fitting within said recess, $o^1$. This sleeve is mounted on a ball bearing $o^4$ so that it can oscillate on the spindle $o^2$, or by any other suitable device; it normally tends to assume the position shown in Fig. 6. In order to accomplish this result the relative masses of the magnetic and non-magnetic materials of which the sleeve is composed are so distributed around the axis of the sleeve as to hold the sleeve normally in a predetermined position as indicated in Fig. 6. Thus, as is indicated in Fig. 6 the portion, $o^3$, forms a spur which extends on the opposite side of a vertical plane passing through the axis of the wing, from the other portions of the non-magnetic part, below the axis, and thus contributes to the stabilization of the ring and assists in compensating for the difference in the specific gravities of the magnetic and non-magnetic portions. In other words, in the formation of this ring the magnetic and non-magnetic portions are so arranged with respect to each other, and the axis of rotation, that the ring will normally take the position shown in Fig. 6, and remain therein in stable equilibrium, unless deflected by the rotation of the armature shaft. As the dynamo field distortion increases under the increase of speed, a partial rotary movement is imparted to the sleeve $o$, $o^2$, the effect of which movement is to reduce the number of magnetic lines of force passing through the armature, the sleeve thus acting as a variable magnetic shunt.

The sleeve hangs freely on the spindle, $i$, the distribution of weight of the magnetic and non-magnetic portions of the sleeve causing it to normally assume the position shown in Fig. 6. The position of the sleeve will be varied as the field distortion increases, the distribution of the weight of the magnetic and non-magnetic portions always tending to restore the sleeve to its normal position.

It will be obvious that as the speed of the armature increases the distortion of the magnetic field will be correspondingly increased, and it will also be understood that the rotation of the armature shaft within the bearing of the sleeve, $o$—$o^2$ will produce a drag tending to rotate said sleeve with the shaft of the armature in the direction of the arrow in Fig. 6 which drag is resisted by the downward pull of gravity on the sleeve which normally tends to restore it to the position shown in Fig. 6. The greater the speed the greater the drag on the sleeve, and this drag will cause it to partially rotate so as to bring the magnetic portions, $o$, across between the pole pieces and afford a more direct passage for the lines of force of the adjacent portions of the pole shoes thereby diverting some of the lines of force from passing through the armature and counteracting the increase of voltage, which would otherwise result from the increase of speed. In this way the sleeve, $o$—$o^2$ acts as a regulator to maintain a substantially constant output.

As will be obvious, a convenient form of device may be used in connection with the sleeve $o$, $o^2$ so as to control the position of the latter in accordance with the speed of rotation of the dynamo.

In Figs. 7 to 10 I have illustrated a machine in which the magneto and dynamo units are caused to intermesh in such a manner that they can move relatively to one another as in the arrangement hereinbefore stated and described, means being also shown whereby the two units can be rigidly secured or locked in any position to which they may be adjusted. In this construction, the yoke of the pole-shoes $f$ of the dynamo is formed with two lateral depending portions $s$ which enter into lateral rebates or recesses $t$ in the pole-shoes $d^0$ of the magneto unit, the two parts being fitted together in such a manner that they can slide one within the other, adjustment between the two parts being effected by the right and left handed screws $u$, shown in dotted lines, which enter corresponding screw-threaded holes in the portions $s$ of the said dynamo yoke and the pole pieces $d^0$ of the magneto unit. The dynamo unit is shown of the combined permanent and electro-magnet type, subsidiary windings $v$, $v$, Fig. 7, being provided on the permanent magnets $g^1$ for regulating purposes and being adapted to function either as magnetizing or demagnetizing agents.

What I claim and desire to secure by Letters Patent is:

1. In a magneto electric machine for ignition and lighting purposes, the combination with a magneto unit for ignition purposes, a dynamo unit for lighting purposes separate from the magneto unit, and means for detachably connecting said units to form a unitary structure, whereby one of said units may be removed without effecting the normal operation of the other unit.

2. In a magneto electric machine for ignition and lighting purposes, the combination with a magneto unit for ignition purposes, of a separate dynamo unit for lighting purposes, means for detachably connecting said separate units, means for operatively connecting a member of the magneto unit with a driving member, and detachable gear connections between said member of the magneto and a member of the dynamo unit, whereby said dynamo unit may be removed without interfering with the normal operation of the magneto unit.

3. In a magneto electric machine for ignition and lighting purposes, the combination with a magneto unit for ignition purposes, of a separate dynamo unit for lighting purposes, means for supporting said dynamo unit in movable relation with the magneto unit, and driving connections between said member and a member of the dynamo unit adapted to be maintained in operative relation by the relative movement of the dynamo unit with respect to the magneto unit.

4. In a magneto electric machine for ignition and lighting purposes, the combination with a magneto unit for ignition purposes, of a separate dynamo unit, inter-engaging guiding devices connecting said units to permit a relative movement of one unit with respect to the other, means for driving a member of the magneto unit, and gearing connecting said member with a member of the dynamo unit adapted to be maintained in operative relation by the relative movement between said units.

5. In a magneto electric machine for ignition and lighting purposes, the combination with a magneto unit for ignition purposes, of a separate dynamo unit, inter-engaging guiding devices for connecting said units, means for moving one of said units with respect to the other, means for driving a member of one of said units, gearing connecting said member with a member of the other unit, and adapted to be held in operative condition by the said means for moving one of said units with respect to the other.

6. In a magneto electric machine for ignition and lighting purposes, the combination with a magneto unit for ignition purposes, of a separate dynamo unit, inter-engaging guiding means for connecting said units but permitting each unit to move with respect to the other, a spring engaging the movable unit, means for driving a member of one of said units, and gearing connecting said member with a member of the other unit, and adapted to be maintained in operative relation by said spring.

7. In a magneto electric machine for ignition and lighting purposes, the combination with a magneto unit for ignition purposes, of a separate dynamo unit, inter-engaging guiding devices for connecting said units but permitting the movement of the dynamo unit with respect to the magneto unit, means for driving a member of the magneto unit, and driving mechanism connecting said member with a member of the dynamo unit, and springs interposed between said units, and normally tending to move the dynamo unit in a direction to maintain said gearing in operative relation.

8. In a magneto electric machine for ignition and lighting purposes, the combination with a magneto unit for ignition purposes, of a separate dynamo unit, detachably secured to the magneto unit, inter-engaging guiding devices for connecting said units for holding them in operative relation while permitting the movement of the dynamo unit in a direction toward or from the magneto unit, means for driving a member of the magneto unit, gearing connections between said member and a member of the dynamo unit, and means interposed between said units for moving the dynamo unit with respect to the magneto unit to maintain said gearing in operative relation and compensate for wear, whereby said dynamo unit can be entirely removed from the magneto unit without interfering with the normal operation of the magneto unit.

9. In a magneto electric machine for combined ignition and lighting purposes, the combination with a magneto unit of guiding pillars supported thereon, a separate dynamo unit detachable from and movable with respect to the magneto unit, guiding devices secured to the dynamo unit and engaging said pillars, driving means for a member of said magneto unit, gearing connecting said member with a member of the dynamo unit and coil springs surrounding said pillars, and engaging said dynamo unit for moving it in a direction to maintain said gearing in operative relation and compensate for wear thereof.

10. In a magneto electric machine for combined ignition and lighting purposes, the combination with a magneto unit of guiding pillars supported thereon, a separate dynamo unit detachable from and movable with respect to the magneto unit, guiding devices secured to the dynamo unit and engaging said pillars, driving means for a member of said magneto unit, gearing connecting said member with a member of the dynamo unit, and coil springs surrounding said pillars and interposed between said units for moving the dynamo unit in a direction away from the magneto unit, to maintain said gearing in operative relation and compensate for wear thereof.

11. In a magneto electric machine for combined ignition and lighting purposes, the combination with a magneto provided with permanent magnet member having pole shoes, a rotatable armature interposed between said pole shoes, of a separate dynamo unit, means for detachably connecting the dynamo unit with the magneto, means for driving the magneto armature, and gearing connecting said driving means with the armature.

12. In a magneto electric machine, the combination with a permanent magnet member provided with pole shoes, and a rotatable armature, of a rotatable ring supported concentrically with and movable around the axis of the said armature, said ring being weighted so as to be maintained in a normal position by gravity, and being provided with a portion of magnetic material normally maintained at a distance from one of said pole shoes, and adapted to be brought into a position to afford a path of less resistance to certain lines of force between said pole shoes, than is afforded across the armature, by an increase in the speed of the armature.

13. In a magneto electric machine, the combination with a permanent magnet member provided with pole shoes, and a rotary armature provided with a supporting shaft, of a ring loosely mounted on said shaft adjacent to one end of said armature and lying between portions of said pole shoes, said ring being weighted to hold it by gravity normally in a predetermined position and being composed of portions of non-magnetic material and portions of magnetic material, the magnetic material being normally supported adjacent to one of said pole shoes and at a distance from the other pole shoe, whereby the increase in speed of the armature shaft will cause a partial rotation of said ring so as to bring the magnetic material more or less in line between said pole shoes and divert a portion of the lines of force therethrough and away from the armature.

FREDERICK LOUIS HOLLISTER.

Witnesses:
C. G. REDFERN,
JOHN E. BOUSFIELD.